Figure 1:
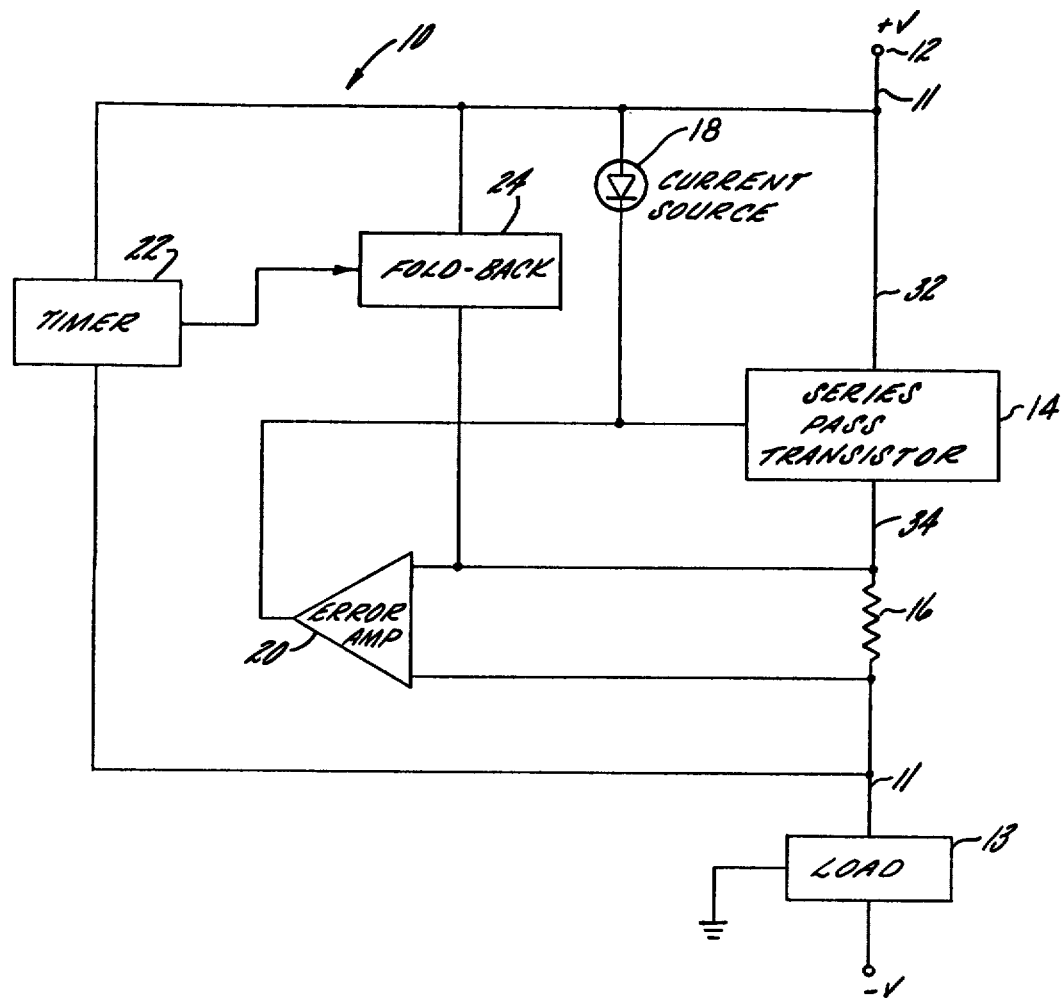

United States Patent [19]

Bishop et al.

[11] 4,203,141
[45] May 13, 1980

[54] LOW POWER DISSIPATION SERIES REGULATOR FOR PCM REPEATER LINES

[75] Inventors: Larry D. Bishop, Colleyville, Tex.; Jack C. Parker, Jr., Bolingbrook, Ill.

[73] Assignee: Wescom, Inc., Downers Grove, Ill.

[21] Appl. No.: 891,531

[22] Filed: Mar. 30, 1978

[51] Int. Cl.$^2$ .............................................. H02H 3/08
[52] U.S. Cl. ...................................... 361/18; 361/94; 361/98; 323/9
[58] Field of Search ................... 361/18, 98, 100, 93, 361/94; 323/4, 9, 22 T, 18, 19, 20; 179/77, 99, 8 R

[56] References Cited

U.S. PATENT DOCUMENTS

| | | | |
|---|---|---|---|
| 3,182,246 | 5/1965 | Lloyd | 361/18 X |
| 3,345,554 | 10/1967 | Lupoli | 361/18 X |
| 3,748,569 | 7/1973 | Frank | 361/18 X |
| 3,753,079 | 8/1973 | Trilling | 361/18 X |
| 3,771,021 | 11/1973 | Bierly | 361/18 |
| 3,796,943 | 3/1974 | Nelson et al. | 361/18 X |
| 3,940,572 | 2/1976 | Burgess | 361/18 |
| 3,959,713 | 5/1976 | Davis et al. | 361/18 X |
| 4,127,886 | 11/1978 | Easter | 361/18 |

OTHER PUBLICATIONS

"Pulse Width Regulated Conversion for Span Line Powering", by Townsend, National Telecommunications Conference, Conference Record, vol. III, p. 442-1, Dec. 5-7, 1977.

Primary Examiner—Patrick R. Salce
Attorney, Agent, or Firm—Leydig, Voit, Osann, Mayer & Holt, Ltd.

[57] ABSTRACT

A current regulator for a pulse code modulated (PCM) transmission line is interposed between a voltage potential and a load (consisting of repeater amplifiers along the PCM transmission line) for limiting the current flow to the load. During normal operation, the regulator provides a relatively low impedance path from the voltage potential to the load through a series pass transistor and a sensing resistor. During an overload condition, which is sensed by the sensing resistor, the series pass transistor is deprived of base drive thereby providing a high impedance path with an accompanying increased voltage drop across the series pass transistor of the series regulator. This voltage drop is used to drive a timer which turns the series pass transistor off and on, with a low on time or duty cycle, in order to minimize power dissipation during the overload condition. After the overload condition has been alleviated, the series pass transistor is turned back on by the timer, and due to the low current flowing to the load, the series pass transistor is again returned to its relatively low impedance conducting condition.

3 Claims, 2 Drawing Figures

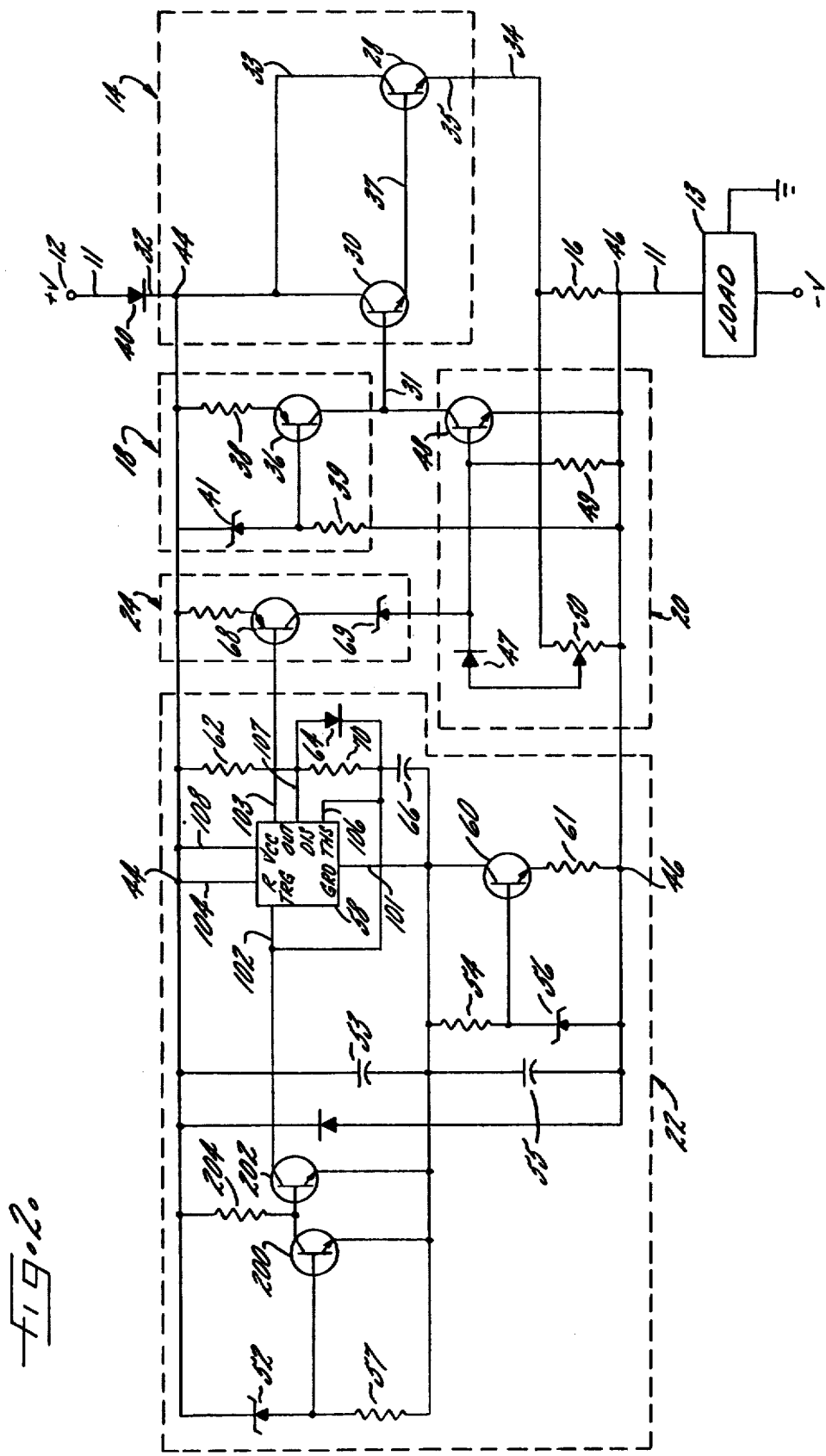

LOW POWER DISSIPATION SERIES REGULATOR FOR PCM REPEATER LINES

BACKGROUND OF THE INVENTION

This invention relates generally to telephony and more particularly to a low power dissipation, series regulator for use with a pulse code modulated (PCM) transmission line to limit current used to power repeater amplifiers along the transmission line.

In a PCM transmission system a number of analog signals are digitized, multiplexed and transmitted as bipolar digital pulses on a transmission line. The transmission line is a two conductor cable. In order to maintain timing and amplitude of the PCM bipolar pulses, repeater amplifiers are interposed at predetermined intervals to amplify and reshape the bipolar pulses. In order to provide power to the repeater amplifiers along the transmission line the two conductors carry positive or negative d.c. current in addition to carrying the bipolar pulses.

In existing PCM systems the negative (or positive) conductor is provided with a current regulator to assure proper operation of the repeater amplifiers during normal operation. The other conductor (positive or negative) is unregulated and only has a fuse to protect it. In such a conventional system, a short circuit from the positive conductor to ground either accidentally or due to the extinguish time of a current surge protector (generally a gas discharge tube) may, after a short time (less than two seconds), cause a terminal carrier group alarm (CGA) which will disconnect all the PCM users for 20 seconds. Furthermore, the short circuit current or the protector's conduction currrent may blow the fuse in the positive conductor thereby making the entire system inoperative and requiring maintenance of the system before it can be used again to carry information.

One solution to the problem of short circuits in the positive conductor of a PCM transmission line is to provide a current regulator which would limit the current to allow the surge protector to extinguish or protect the equipment until the short is removed. However, a conventional current limiting circuit is not practical due to the high power dissipation with its accompanying heat that would result if the short circuit existed over an extended period of time. Therefore, it is necessary to provide a series regulator in the positive conductor which, in case of an extended short circuit condition, will cycle on and off until the short circuit condition ceases at which time the regulator will automatically resume normal operation. In order to minimize the power dissipated by the series regulator during the short circuit condition, the regulator must operate at a low duty cycle. In other words the regulator must be on for less time than it is off. Moreover, the duty cycle timing also must not be significantly dependent upon either the ambient temperature or the short circuit line current.

The prior art does not provide a series regulator which can adequately solve the need for a low power dissipation series regulator in a PCM transmission line. For example, U.S. Pat. No. 3,903,475 issued to Mokrani et al. shows a current limiting circuit having a pair of series pass transistors which are controlled by a time out circuit which shuts the system down after an overload condition persists for a predetermined period such as two or three seconds. There is no provision made in the Mokrani patent to automatically turn on the series regulator again in order to resume operation after the overload condition has ceased.

U.S. Pat. No. 3,959,713 issued to Davis et al. discloses a series pass regulator which provides a temperature sensing device which controls a series pass transistor. The temperature sensing device turns off the series pass transistor in response to an increase in temperature in the sensing device resulting from an overload condition. After the series pass transistor has been turned off and the heat in the sensing device has dissipated, the temperature sensing device turns on the series pass transistor again so as to restart the series regulator. The process is repeated until the overload condition has ceased, and the regulator of the Davis et al. patent then operates in its normal mode. However, the operation of the Davis et al. regulator is dependent both on the ambient temperature and the short circuit current. As a result, the maximum current required to induce shut down varies as well as the ratio of the on and off times for the series regulator during the overload condition.

It is an object of the present invention to provide a two terminal series regulator for a d.c. current conductor of PCM transmission line which, in the presence of an overload condition, will operate for a first predetermined time at a predetermined, predictable maximum overload current level, which will then provide a low power shut down condition for a second predetermined time, and which will alternatively turn itself on and off with a predictable, low duty cycle until the overload condition ceases.

It is further an object of the present invention to provide a series regulator for the d.c. current conductor of a PCM transmission line which has a duty cycle and a maximum current level that are not significantly dependent on the ambient temperature or the overload line current.

It is also an object of the invention to provide a timer for the series regulator for timing the first and second predetermined times, thereby establishing the series regulator's duty cycle, which timer is energized solely by the voltage drop across the terminals of the series regulator.

Collaterally it is an object of the invention to provide a timer having a reference voltage diode and a current source to assure that if the voltage drop across the series regulator exceeds a threshold voltage, the voltage supplied to a timing circuit in the timer will be substantially constant and thereby assure predictable timing of the series regulator's duty cycle.

Other objects and advantages will become apparent upon reading the following detailed description and upon reference to the drawings, in which:

FIG. 1 is a block diagram of a current regulator embodying the present invention; and FIG. 2 is an electrical schematic diagram of a current regulator embodying the present invention.

While the invention will be described in connection with the preferred embodiment, it will be understood that we do not intend to limit the invention to that embodiment. On the contrary, we intend to cover all alternatives, modifications and equivalents as may be included within the spirit and scope of the invention as defined by the appended claims.

Turning to FIG. 1, a current regulator 10 is interposed in conductor 11 of a PCM transmission line having a number of repeater amplifiers (indicated as a lumped load 13). The conductor 11 interconnects positive voltage source 12 and the repeater amplifiers and supplies d.c. power to the repeater amplifiers 13. Current regulator 10 has a controllable series pass transistor circuit 14 and a sensing resistor 16 in series between the voltage source 12 and the load.

During the normal operation of the PCM transmission system, the d.c. current being supplied to the repeater amplifiers in positive conductor 11 of the transmission line passes through series pass transistor circuit 14 and sensing resistor 16 of regulator 10 which are both in series with the load and the voltage source 12. Also during normal operation, current source 18 provides base drive current to the series pass transistor circuit 14 and drives series pass transistor circuit 14 into conduction so that the voltage drop across the series pass transistor circuit is kept low (in the order of 4.5 volts). Moreover, the sensing resistor 16 is also of a low value so that no significant voltage is dropped across that resistor during normal operation.

Because the voltage drop across the series pass transistor circuit 14 and the sensing resistor 16 is small, the voltage across timer 22 is not sufficient to activate the timer 22. Also, the small voltage drop across sensing resistor 16 is insufficient to activate error amplifier 20. As a result, the regulator 10 operates as a low impedance connection between voltage source 12 and the load 13.

As previously described, the conductor 11 between the regulator 10 and the load may be grounded either accidentally or by a surge protector (not shown) firing. As a result, a higher than normal current begins flowing in conductor 11 through series pass transistor circuit 14 and sensing resistor 16. The increased current flowing in sensing resistor 16 causes the error amplifier 20 to operate and to begin diverting base drive current (supplied by current source 18) away from the series pass transistor circuit 14. As a result, series pass transistor circuit 14 is deprived of base drive current and begins operating in its active region with increased impedance and an increased voltage drop between its input 32 and output 34 which are in series with conductor 11. Moreover, as the series pass transistor circuit 14 is deprived of base drive current by the error amplifier 20, the series pass transistor circuit 14, as a result of its increased impedance, conducts less current between its input 32 and its output 34 until an equilibrium is reached between the error amplifier 20, the current source 18 and the series pass transistor circuit 14 which determines a maximum current level (preferably 175 milliamps) that can flow in the positive conductor 11. The predetermined maximum current level is not sufficiently large to damage any of the system's components nor is it sufficiently large to keep the surge protector in a conducting state.

With the maximum current flowing through series pass transistor circuit 14, the increased voltage drop across series pass transistor circuit 14 and resistor 16 is sufficient to energize timer 22. After a first predetermined time, determined by the parameters of timer 22, the timer turns on a fold-back circuit 24. The fold-back circuit 24 conditions the error amplifier 20 so that nearly all of the current produced by current source 18 is diverted to the error amplifier 20 and no current is available to provide base drive to the series pass transistor circuit 14. Therefore, without any base drive current, series pass transistor circuit 14 is turned off and negligible current flows in conductor 11.

After the timer 22 has turned on the fold-back circuit, which in turn has turned off series pass transistor circuit 14, the timer times out a second predetermined time period which is longer than the first predetermined time period, and then turns off the fold-back circuit with the result that the series pass transistor circuit 14 is again turned on.

When the series pass transistor circuit 14 has been turned back on by the action of timer 22 and fold-back circuit 24 after the second predetermined time interval, the series pass transistor circuit begins conducting current in conductor 11 under the control of error amplifier 20. If the overload condition has ceased when the series pass transistor circuit 14 is turned back on by the timer's action, the error amplifier detects only a small current in sensing resistor 16 and allows all of the current from current source 18 to drive the series pass transistor circuit into its low impedance state, and normal operation continues.

However, if the overload condition still exists at the time the series pass transistor circuit is turned back on by the timer's action, the error amplifier senses the overload current in sensing resistor 16 and diverts base drive current away from series pass transistor circuit 14 thereby limiting the current in conductor 11 to the predetermined maximum level. Moreover if the overload continues, the timer is still energized by the large voltage drop across the active, high impedance series pass transistor circuit and the sensing resistor, and the timer begins to time out the first predetermined time interval again in order to activate the fold-back circuit 24 for a second time and to shut down the series pass transistor circuit again. As long as the overload condition exists the timer continues to turn the series pass transistor circuit off and on by means of the fold-back circuit and error amplifier.

Preferably the timer is constructed so that the time during which the series pass transistor circuit is on is less than the time during which the series pass transistor circuit is off. As a result, the series pass transistor circuit has a relatively low duty cycle so that the heat built up in the series pass transistor circuit is not sufficient to damage the transistor.

As a result of the timer control of regulator 10, the duty cycle of the series pass transistor circuit during an overload condition is not dependent upon the overload current flowing in conductor 11 nor is it dependent upon the ambient temperature or the temperature of the series pass transistor circuit itself. The on and off time for the series pass transistor circuit and its duty cycle can be reliably predicted, and the designer of the system can be assured that the current regulator 10 will provide the best protection for the particular system.

Also it will be apparent that the predetermined maximum current is not dependent on the ambient temperature.

Turning to FIG. 2, which is an electrical schematic for the current regulator 10 for a PCM transmission line, the current regulator 10 is interposed in conductor 11 in series between the voltage source 12 and the load 13 (the repeater amplifiers). Current regulator 10 comprises series pass transistor circuit 14 which includes series pass transistor 28 and emitter follower transistor 30 connected as a Darlington pair. The collector 33 and emitter 35 of series pass transistor 28 provide the primary conduction path between positive voltage source 12 and the load 13.

Transistor 28 is driven by current source 18 which includes transistor 36, zener diode 41, and resistors 38 and 39. The zener diode 41 establishes a reference voltage which in turn establishes a constant emitter current through resistor 38 and a constant collector current for transistor 36. Transistor 36 of the current source 18 provides current to base 31 of emitter follower transistor 30 which in turn provides sufficient base current drive to base 37 of series pass transistor 28.

Sensing resistor 16 is connected in series with emitter 35 of transistor 28 so that current flowing through transistor 28 to the load is conducted through sensing resistor 16. As a result the voltage drop across sensing resistor 16 is proportional to the current flowing through regulator 10 to the load.

During normal operation the d.c. current from d.c. voltage source 12 flows through blocking diode 40, through transistor 28, through sensing resistor 16 and to the load 13. Because during normal operation the current is small and because transistor 28 is turned on and has a relatively low collector to emitter impedance, there is a small voltage drop across both the transistor 28 and the sensing resistor 16. As a result, the voltage drop across resistor 16 does not exceed the threshold voltage required to activate error amplifier 20. Also the combined voltage drop across resistor 16 and transistor 28 (across inputs 44 and 46 of timer 22) does not exceed the threshold voltage required to energize the timer 22.

During an overload condition the current in conductor 11 increases and, as a result, the voltage drop across sensing resistor 16 also increases. The increased voltage across sensing resistor 16 is connected via potentiometer 50 and diode 47 to the base of error amplifier transistor 48. When the voltage from potentiometer 50 exceeds the forward voltage drops of diode 47 and the base-emitter junction of transistor 48, transistor 48 conducts. As a result of transistor 48 conducting, the current supplied by transistor 36 of current source 18 to base 31 of emitter follower transistor 30 is diverted from base 31 of emitter follower transistor 30 through transistor 48. With less base current available to drive emitter follower transistor 30 and, therefore, less base drive current for series pass transistor 28, series pass transistor 28 operates in its activate region resulting in a higher collector to emitter impedance and a higher voltage drop across transistor 28.

By adjusting potentiometer 50 in the error amplifier 20 in conjunction with the value selected for resistor 49, an equilibrium is established so as to limit the overload current to a fixed predetermined maximum value. In the preferred embodiment, 175 milliamperes is the value for the maximum current. That current value is not sufficiently large to damage components along the line or to supply conduction current to maintain surge protectors in their fired state.

Reference to FIG. 2 shows that the inputs 44 and 46 of timer 22 are connected across the series combination of transistor 28 and sensing resistor 16. When transistor 28 is operating in its higher impedance, active conduction region and with the predetermined maximum overload current flowing through transistor 28, the increased voltage drop that appears between the collector 33 and emitter 35 of transistor 28 plus the voltage drop across resistor 16 are together sufficient to exceed the threshold voltage (between inputs 44 and 46) for energizing the timer 22. The threshold voltage for the timer is established by the combined voltage drop of reference zener diode 52, the base-emitter drop of transistor 200 and zener diode 56. When the timer input voltage (between inputs 44 and 46) exceeds the threshold voltage, current flows through the reference zener diode 52, the base-emitter junction of transistor 200, resistor 54 and zener diode 56, and timer 22 is energized.

The current flowing in zener diode 52 and the base-emitter junction of transistor 200 establishes the d.c. reference voltage between power terminals 108 (d.c. voltage or Vcc) and 101 (d.c. voltage return or GRD) of integrated timing circuit 58 and thus provides power to timing circuit 58. The integrated timing circuit 58 may be a standard timing circuit such as a Signetics 555 Timer, manufactured by Signetics Corporation, Sunnyvale, Calif. The reference voltage established by reference zener diode 52 and the base-emitter junction of transistor 200 assures that the integrated timing circuit 58 is supplied its specified voltage so that it can accurately time out the first and second predetermined times which establish the preferred low duty cycle for the regulator. Moreover, decoupling capacitors 53 and 55 assure that the d.c. reference voltage is free of a.c. distortion to further assure accurate timing.

The zener diode 56 in combination with transistor 60 and emitter resistor 61 provides a current source which establishes a constant current return path for integrated timing circuits d.c. voltage return terminal 101. The current source is used to limit power dissipation in the return path of the timing circuit and to establish a constant charging and discharging current to the timing mechanism of the integrated timing circuit.

Initially, before the threshold voltage is exceeded no current flows in zener diode 52 or the base-emitter junction of transistor 200. As a result, transistor 200 is turned off and any voltage across inputs 44 and 46 flows through biasing resistor 204 to turn on transistor 202. With transistor 202 turned on, the trigger input 102 of timing circuit 58 is connected to d.c. voltage return terminal 101 and thereby assures that output pin 103 remains "high" with respect to terminal 101 for all voltages (between inputs 44 and 46) below the threshold voltages. Keeping output pin 103 "high" assures that the fold-back circuit 24 is not activated until the threshold voltage across the timer 22 is reached and the timer can begin its timing sequence.

When the threshold voltage established by zener diodes 52 and 56 and by the base-emitter junction of transistor 200 is exceeded, the current flowing in the base-emitter junction of transistor 200 turns on transistor 200. When transistor 200 turns on, transistor 202 is turned off so that trigger input 102 is no longer connected to return terminal 101. Disconnection control input 102 from return terminal 101 allows control input 102 to go to a "high" condition so that the timing circuit is enabled.

As previously described, transistors 200 and 202 are provided to control trigger input 102 during the transition state of the current regulator before the voltage across the timer (between nodes 44 and 46) exceeds the threshold. Such control is necessary because a voltage less than the threshold voltage may cause current to leak through the integrated circuit 58 and provide sufficient voltage to activate transistor 60. This low leakage current may also be sufficient to start the timing sequence of timing circuit 58 at a time when the voltage across terminals 108 and 101 is less than the value specified for proper operation of timing circuit 58. The result may be unpredictable timing by circuit 58. However, as long as trigger input 102 is connected by means of transistor 202 to terminal 101, the integrated circuit is disabled, and the current leakage has no effect.

Once the timer input voltage has exceeded the threshold voltage, the timing circuit 58 operates to time out the on and off times for the regulator. The d.c. reference voltage established by zener diode 52 and the base-emitter drop of transistor 200 is applied between terminal 108 (d.c. voltage) and terminal 101 (d.c. voltage return) of the integrated timing circuit 58. (Reset input 104 is connected to terminal 108 to assure that the reset input is disabled). Initially the voltage on output pin 103 of the integrated timing circuit is "high" with respect to pin 101.

After the threshold voltage for the timer is exceeded, the d.c. reference voltage appears between terminals 108 and 101, and trigger input 102 is disconnected from terminal 101 by the action of transistor 202. As a result, current begins flowing through resistor 62 and diode 64 to charge capacitor 66 to establish the first predetermined time interval during which the series pass transistor 28 conducts the maximum overload current (175 ma) to the line. The capacitor 66 is connected between terminal 101 and trigger input 102 and threshold input 106 of the integrated timing circuit 58. Within approximately two seconds after the threshold voltage of the timer is exceeded, capacitor 66 (which initially had a zero voltage across it) is charged up to ⅔ of the value of the reference voltage existing between terminals 108 and 101 of the integrated timing circuit 58.

At that point in time, the integrated timing circuit in response to the charge on capacitor 66 causes output pin 103 to go "low" (approaching the value of the voltage at terminal 101). When output pin 103 goes "low," it turns on fold-back transistor 68 of fold-back circuit 24. When the zener voltage of zener diode 69 is exceeded, transistor 68 supplies sufficient base drive current to transistor 48 of error amplifier 20 to turn transistor 48 fully on. With transistor 48 fully on, all of the base drive current supplied by the current source 18 is diverted away from emitter follower transistor 30 and series pass transistor 28. As a result, series pass transistor 28 goes from active conduction to cut off, and negligible current flows in conductor 11. Moreover, when series pass transistor 28 is cut off, regulator 10 is dissipating negligible power.

As soon as the fold-back circuit 24 is activated in response to output pin 103 of integrated timing circuit 45 going low, the capacitor 66 begins discharging through resistor 70 and discharge pin 107 of the integrated timing circuit. Because resistor 70 is of higher value than the resistive combination of resistor 62 and diode 64, the discharge time for capacitor 66 is longer than the charge time was. In the preferred embodiment the discharge time (the RC time constant of resistor 62, diode 64 and capacitor 66) is approximately 15 seconds. When capacitor 66 is discharged after 15 seconds, discharge pin 107 is then "low" (approaching the value of the voltage at pin 101), and the timing circuit switches causing output pin 103 to go "high."

With output pin 103 "high," the fold-back circuit's transistor 68 ceases conducting, and the only current supplied to the base of transistor 48 results from the current flowing is sensing resistor 16. If the overload condition has ceased when timer 22, by means of fold-back circuits 24, restores the series pass transistor 28, the normally small load current through sensing resistor 16 will not turn on transistor 48 of error amplifier 20, and series pass transistor 28 will be turned on. As a result of series pass transistor 28 being turned on, the voltage drop across inputs 44 and 46 will be less than the timer's threshold voltage, and the timer will be disabled. Therefore, the regulator 10 will operate in its normal mode with the normal load current flowing from voltage source 12 through transistor 28 and the sensing resistor 16 to the load.

On the other hand if the overload still exists, the sensing resistor 16 and the error amplifier 20 will cause the series pass transistor to operate in its active region with a volage drop which will again exceed the timer's threshold voltage so that the timing sequence will be initiated again. Therefore, the operation of on-off cycling will continue two seconds on followed by 15 seconds off providing a low duty cycle until the overload condition ceases.

Finally, the regulator circuit 10 provides for manually resetting after the overload condition has been alleviated and before the normal automatic time out sequence has occurred by simply disconnecting the regulator from the voltage source 12. Because the regulator 10 is usually contained on a pluggable circuit card mounted in a circuit shelf, disconnecting voltage source 12 is accomplished by simply pulling the circuit card out of the circuit shelf and reinserting it. When the circuit card is reinserted in the shelf and the voltage source 12 is thus reconnected to the circuit, the low load current (overload has been alleviated) fails to activate the error amplifier 20, and the series pass transistor 28 is turned on to provide a low impedance path for the normal load current.

We claim:

1. In an overload current regulator having first and second terminals adapted to be connected in a line between a voltage potential and a load, the combination comprising:
  (a) a controllable impedance device interposed between the terminals to control the current flow in the line and having a relatively low impedance when small currents flow in the line;
  (b) sensing means in series with the impedance device for sensing the current flowing in the line and operatively connected to the impedance device to increase the impedance thereof to limit the current flowing in the line to a predetermined maximum level;
  (c) a timer having inputs connected between the two terminals and an output operatively connected to the impedance device to control the impedance thereof, the timer in sequence being activated when the current flowing in the line has reached the maximum level, timing out a first predetermined time, increasing the impedance of the device to a maximum level to inhibit current flow in the line, timing out a second predetermined time, and decreasing the impedance of the device to the aforementioned relatively low impedance; and
  (d) timer control means connected across the two terminals and operatively connected to the timer for assuring that the timer is initialized before the timer is activated.

2. The combination of claim 1, wherein the timer includes an integrated, two stage, switchable timing circuit, in combination with first and second resistor-capacitor timing networks, a reference voltage diode circuit connected across the timing circuit to provide a fixed reference voltage to the integrated timing circuit so that the timer can be energized by an unpredictable voltage drop between the terminals, which voltage drop results when the predetermined maximum current level is achieved, and a current return path having a constant current source so that the current flowing to the integrated timing circuit and to the first and second resistor-capacitor timing networks will be constant to provide predictable timing of the respective first and second predetermined times.

3. An overload current regulator having first and second terminals adapted for series connection in a line extending from a d.c. voltage source to a load, said regulator comprising, in combination, (a) a series pass transistor;
(b) a current sensing element,
said pass transistor having its collector path connected in series with the sensing element between the first and second terminals,
(c) a current source for placing the pass transistor in a low resistance condition when current drawn by the load is normally low;
(d) amplifier means responsive to a signal from the sensing element exceeding a predetermined first threshold for modifying the action of the current source and placing the pass transistor in an active controlled conduction and an intermediate resistance condition;
(e) a timer responsive to the voltage between the first and second terminals exceeding a predetermined second threshold for turning the pass transistor fully off after a first predetermined time interval, the timer sequentially being operative at the end of a second predetermined time interval for restoring the pass transistor to its low resistance condition, the timer including an integrated, two stage, switchable timing circuit in combination with first and second resistor-capacitor timing networks, a reference voltage diode circuit connected across the timing circuit to provide a fixed reference voltage to the integrated timing circuit so that the timer can be energized by an unpredictable voltage drop between the terminals, which voltage drop results when the predetermined maximum current level is achieved, and a current return path having a constant current source so that the current flowing to the integrated timing circuit and to the first and second resistor-capacitor timing networks will provide predictable timing of the respective first and second predetermined times.

* * * * *